United States Patent
Terpstra

(10) Patent No.: US 6,916,236 B2
(45) Date of Patent: Jul. 12, 2005

(54) EXTRACTION APPARATUS

(75) Inventor: Steven Terpstra, Western Australia (AU)

(73) Assignee: Terpstra Enterprises PTY Ltd., Armadale (AU)

( * ) Notice: Subject to any disclaimer, the term of this patent is extended or adjusted under 35 U.S.C. 154(b) by 0 days.

(21) Appl. No.: 10/732,829

(22) Filed: Dec. 11, 2003

(65) Prior Publication Data

US 2005/0034715 A1 Feb. 17, 2005

Related U.S. Application Data

(63) Continuation-in-part of application No. PCT/AU02/00771, filed on Jun. 13, 2002.

(30) Foreign Application Priority Data

Jun. 13, 2001 (AU) ............................................. PR5664
Oct. 24, 2003 (AU) ....................................... 2003905884

(51) Int. Cl.[7] ............................................. B24B 23/00
(52) U.S. Cl. ................................... 451/358; 451/456
(58) Field of Search ......................... 451/358, 450–454, 451/456, 344; 83/169, 698.11; 30/390, 233

(56) References Cited

U.S. PATENT DOCUMENTS 5,297,363 A * 3/1994 Schroder et al. ............ 451/358
5,566,457 A * 10/1996 Batschari et al. ............. 30/390
5,826,478 A * 10/1998 Zerrer .......................... 83/169
6,561,887 B2 * 5/2003 Lai et al. ...................... 451/358
6,648,742 B1 * 11/2003 Segiel Jr. ..................... 451/451
6,716,095 B1 * 4/2004 Hsu et al. .................... 451/358
2002/0111127 A1 * 8/2002 Tseng .......................... 451/358
2003/0216116 A1 * 11/2003 Chen ........................... 451/358

FOREIGN PATENT DOCUMENTS

| DE | 19953548 C | 3/2001 |
| EP | 549202 A | 6/1993 |
| EP | 430536 A | 3/1994 |

* cited by examiner

Primary Examiner—Lee D. Wilson
(74) Attorney, Agent, or Firm—Harness, Dickey & Pierce, P.L.C.

(57) ABSTRACT

A machine (10) for performing a working operation such as cutting on a workpiece. The machine (10) has a tool (19) for performing the working operation and a drive motor (13) operable to drive the tool. The drive motor (13) has an exhaust (17) through which an exhaust fluid is discharged during operation. Means (51) are provided for delivering a dust suppression fluid such as water into the vicinity of the tool (19) for suppressing dust generated thereby. A shroud (31) is disposed about the tool (19) for containing dust and the dust suppression fluid, and an extraction line (61) communicates with the shroud (71) for extracting dust and dust suppression fluid contained thereby, as well as air within the shroud. The extraction line (61) further communicates with the exhaust (17) of the drive motor (13) for receiving the exhaust fluid discharging therefrom, the exhaust fluid mixing with the air strength flowing from the shroud.

26 Claims, 6 Drawing Sheets

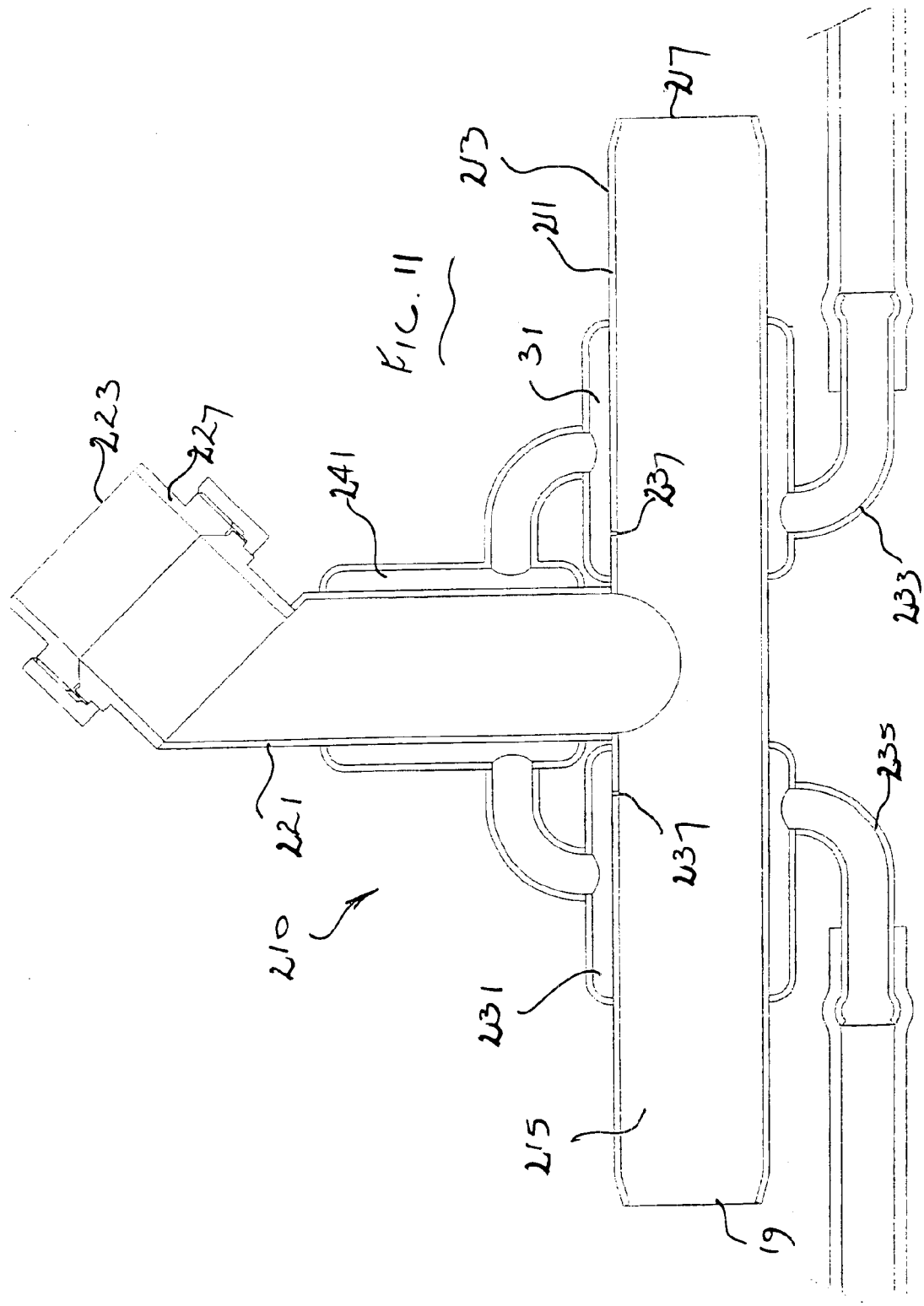

EXTRACTION APPARATUS

This application is a continuation-in-part of PCT International Application No. PCI/AU02/00771 filed on Jun. 13, 2002. The entire contents of each of the above-identified applications are hereby incorporated by reference.

FIELD OF THE INVENTION

This invention relates to an extraction apparatus and to a machine incorporating such extraction apparatus.

The extraction apparatus according to the invention has been devised particularly, although not solely, for use with a machine which is used to perform cutting and chasing operations on brickwork and masonry and which is powered by an internal combustion engine. With use of the extraction apparatus, exhaust gases generated by such a machine may be dispelled from environments where exhaust build-up may create hazardous working conditions.

The extraction apparatus may also be used to extract exhaust gas from other machinery powered by combustion engines, such as chainsaws and lawnmowers.

BACKGROUND ART

It is common to chase a groove or trench into brickwork and masonry to accommodate service lines such as electrical and other cabling, and water and gas supply lines. Typically a chasing operation is performed using a machine having one or more cutting blades.

A significant amount of dust can be generated during a chasing operation. The dust is commonly suppressed using water sprayed into the vicinity of the chasing operation, typically onto the cutting blade.

The use of water to suppress dust leaves a slurry on the surface being chased as well as in the worksite generally. When the slurry dries, it reverts to the dust which can then create further problems.

Furthermore, the use of water to suppress dust precludes the use of electrical machinery, such as electrical grinders which were previously a preferred option for performing chasing operations.

The inability to use electrical machinery requires that other sources of power be utilised. One suitable source of power is a machine driven by an internal combustion engine. Such a machine does, however, have a disadvantage in that its exhaust gases are potentially dangerous, particularly when the machine is operated in confined areas.

It is against this background, and the difficulties and problems associated therewith, that the present invention has been developed.

DISCLOSURE OF THE INVENTION

According to a first aspect of the present invention there is provided an extraction apparatus for a machine having a tool for performing a working operation on a workpiece and a drive motor for driving the tool, the drive motor having an exhaust through which an exhaust fluid is discharged during operation of the drive motor, the extraction apparatus comprising a shroud disposed about the tool for containing dust generated thereby, and an extraction line, the extraction line communicating with the shroud for intake of air within the shroud, the extraction line further communicating with the exhaust of the drive motor for receiving exhaust fluid generated thereby, whereby there is confluence of the air and the exhaust fluid.

The confluence of incoming air and hot exhaust fluid is advantageous in that contact of the air stream with the hot exhaust fluid effects cooling of the exhaust fluid.

The workpiece may be of any appropriate form. Where the machine is employed to perform a chasing operation on a surface (such as a wall surface or floor surface), that surface may constitute the workpiece.

Preferably, the shroud is movable to accommodate changes in orientation of the apparatus with respect to the workpiece. In this way, an effective seal can be achieved between the shroud and the workpiece so as to minimise leakage.

The extraction line may incorporate a flexible section to accommodate the movement of the shroud.

Typically, the extraction line is connected to a suction source such as a vacuum pump. The extraction line may be connected to the suction source by way of a suction hose.

Dust contained within the shroud may be extracted therefrom. The dust can be extracted by entrainment in air drawn from within the shroud into the extraction line. Additionally or alternatively, the dust may be suppressed in the shroud by a dust suppression fluid such as water. The dust suppression fluid can combine with the dust to form a slurry which can drain from the shroud and/or be extracted therefrom via the extraction line.

In certain applications, the extraction apparatus may further comprise a delivery means for delivering a dust suppression fluid to the vicinity of the tool. The shroud also serves to contain the dust suppression fluid, as well as any resulting slurry.

The delivery means may comprise a flexible fluid delivery line.

Preferably, injection means are provided for injecting a cooling fluid into the extraction line.

Typically, the dust suppression fluid and the cooling fluid comprise water.

The suction hose and the fluid delivery line may be conveniently connected together for handling as a single unit. This may be achieved by accommodating the fluid delivery line in the suction hose for at least part of the length thereof. The shroud may incorporate a barrier arranged for preventing rubble and other debris generated during operation of the tool from entering the shroud and clogging the extraction line and suction hose connected thereto.

Water used as the dust suppression fluid may also serve a purpose of lubricating the tool. Additionally, the water content of the slurry may serve to assist cooling of the exhaust fluid, thereby preventing the otherwise hot exhaust fluid from damaging the suction hose.

According to a second aspect of the present invention there is provided a machine for performing a working operation on a workpiece, the machine comprising a tool receiving means for receiving a tool for performing the working operation, a drive motor operable to drive the tool, the drive motor having an exhaust through which an exhaust fluid is discharged during operation, a shroud disposed about the tool for containing dust, and an extraction line, the extraction line communicating with the shroud for intake of air within the shroud, the extraction line further communicating with the exhaust of the drive motor for receiving the exhaust fluid discharging therefrom, whereby there is confluence of the air and the exhaust fluid.

The apparatus may further comprise a delivery means for delivering a dust suppression fluid into the vicinity of the tool for suppressing dust generated thereby.

Preferably, the delivery means for dust suppression fluid comprises an inlet opening onto the interior of the shroud whereby the dust suppression fluid is delivered into the shroud.

Typically, the drive motor is an internal combustion engine such as a petrol engine or a diesel engine, in which case the exhaust fluid comprises exhaust gases from the combustion process.

The tool may be of any suitable type, although as alluded to earlier the extraction apparatus and machine according to the invention have been devised particularly for use in chasing and cutting operations in which case the tool is typically a cutting wheel or a plurality of cutting wheels (usually two such wheels) mounted in tandem.

According to a third aspect of the invention there is provided an extraction apparatus for a machine having an internal combustion engine from which hot exhaust gases are discharged during operation thereof, the extraction apparatus comprising a body defining an outlet, an air inlet communicating with the outlet, flow means to induce flow between the outlet and the inlet from the inlet to the outlet, and an exhaust gas inlet communicating with the outlet, whereby in use there is confluence of incoming air and exhaust gas.

The confluence of the incoming air and the hot exhaust gas is advantageous in that contact of the air stream with the hot exhaust gas stream effects cooling of the exhaust gas.

The flow means may comprise a suction source connected to the outlet or a blower source connected to the inlet.

The air inlet may receive air from any appropriate source. The air may, for example, be ambient air from the environment in which the machine is operating or alternatively the air may be air extracted from a containment zone disposed about a tool operated by the engine. In the latter case, the air is likely to be accompanied by dust generated during operation of the tool, and possibly also water in circumstances where there is use of water for dust suppression.

Preferably, the body defines a flow passage leading to the outlet, with the air inlet and the exhaust gas inlet both opening onto the flow passage.

Preferably, the flow passage comprises an axial passage, with the air inlet being at one end thereof and the outlet being at the other end thereof, such that there is (in use) axial flow of air along the flow passage towards the outlet. The exhaust gas inlet is preferably arranged to deliver exhaust gas into the flow passage downstream of the air inlet. The exhaust gas inlet may be configured to deliver exhaust gas into the flow passage in a flow direction corresponding to the axial flow direction of the air.

There may also be provision for use of a cooling fluid, typically water. In this regard, the body may have provision for water flow in heat exchange relationship therewith for cooling purposes. For example, there may be a water jacket disposed about the passage for heat exchange contact therewith.

Additionally, or alternatively, there may be provision for injection of water into the flow passage to further assist cooling of the exhaust gas.

Where the apparatus does have provision for injection of water into the flow passage, there may be one or more water injection ports in the side wall of the flow passage. The or each injection port may receive water for injection from the water jacket in the body.

Water may be delivered to the apparatus by way of a flexible water delivery line. Water delivered in this may also be used for dust suppression where appropriate. The water may also filter the exhaust gas dissolving a portion of the exhaust therein.

The apparatus may incorporate a filter or scrubber for treating the exhaust gas before being dispelled. This may allow the hazardous components to be extracted from the exhaust gas before it is dispelled. It may even allow for the exhaust gas to be dispelled within the same environment without increasing the hazard to the operator. This may be particularly useful when the machinery is used in underground locations.

The outlet may be connected to the suction source by way of a suction hose. Cooling of the exhaust gas is needed, otherwise heat could cause damage to the suction hose and possibly also the suction source.

The suction hose and the water delivery line may be conveniently connected together for handling as a single unit. This may be achieved by accommodating the fluid delivery line in the suction hose for at least part of the length thereof.

In the alternative situation, the inlet may be connected to the blower source by way of a blower hose. As the blower hose is connected to the inlet, there is no risk of damage due to hot exhaust gases.

The extraction apparatus according to the invention may be provided as a discrete unit that can be fitted to a machine designed for performing cutting and chasing operations. Additionally, the extraction apparatus according to the invention can be incorporated as an integral part of a machine; for example, it may be incorporated as a feature of a new machine or retrofitted as an attachment to an existing machine.

According to a fourth aspect of the invention there is provided a machine having an internal combustion engine from which hot exhaust gases are discharged during operation thereof, the machine further having extraction apparatus according to the first aspect of the invention.

According to a fifth aspect of the invention, there is provided a machine for performing a working operation on a workpiece, the machine comprising a tool receiving means for receiving a tool for performing the working operation, an internal combustion engine operable to drive the tool, the engine having an exhaust through which exhaust gas is discharged during operation, a body defining an outlet for connection to a suction source, the outlet being connected for fluid communication with the engine exhaust, and an air inlet connected for fluid communication with the outlet, whereby in use there is confluence of incoming air and exhaust gas.

When a blower source is used in place of the suction source, the blower source may be connected to the air inlet.

The machine may further comprise means for delivering water into the vicinity of the tool for suppression of dust generated thereby, a shroud disposed about the tool for containment of the dust and also the dust suppression water, and an extraction line communicating at one end thereof with the shroud and at the other end thereof with the air inlet, for extracting dust and dust suppression water carried by air drawn into the shroud and conveyed to the air inlet under the influence of the suction source or blower source.

BRIEF DESCRIPTION OF THE DRAWINGS

The invention will be better understood by reference to the following description of several specific embodiments thereof as shown in the accompanying drawings in which:

FIG. 11 is a side elevational view of an extraction apparatus according to a fourth embodiment.

BEST MODE(S) FOR CARRYING OUT THE INVENTION

Figure 1:
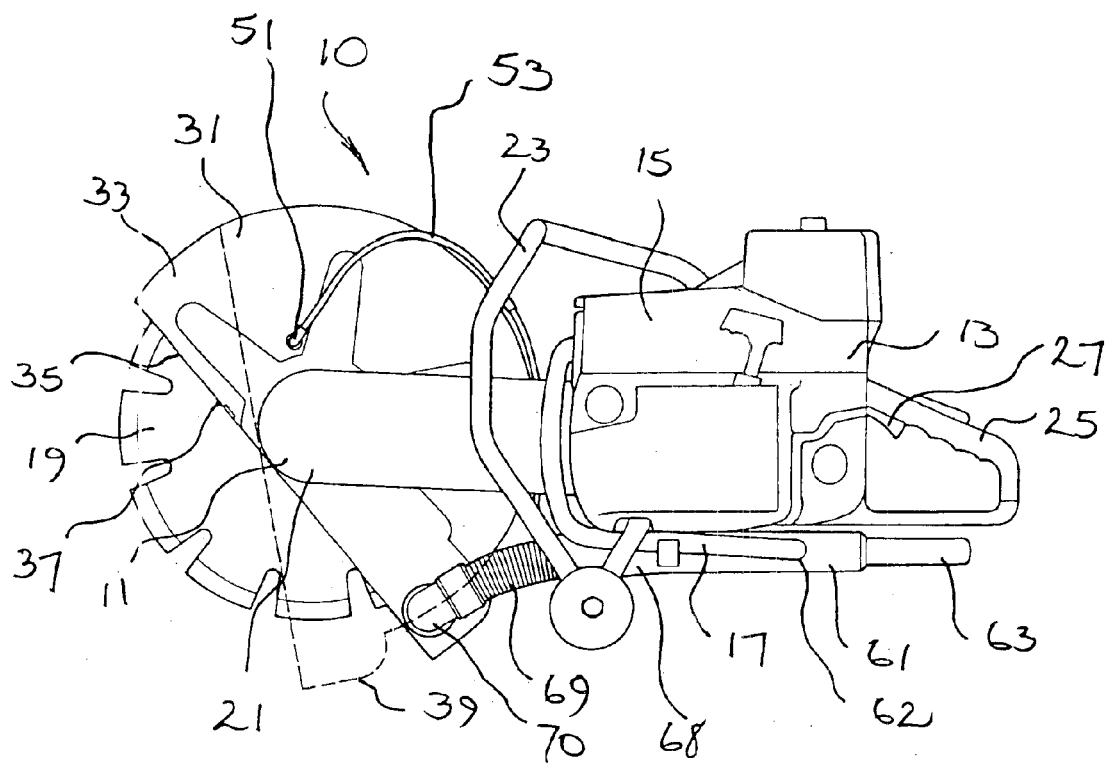
FIG. 1 is a side elevational view from one side of a cutting machine according to a first embodiment.

Referring to FIGS. 1 to 6 of the drawings, there is shown a cutting machine 10 according to a first embodiment for performing cutting and chasing operations on wall and floor surfaces. In this embodiment, the machine 10 is a hand-held unit.

The cutting machine 10 comprises a work head 11 and a body 13 carrying the work head 11. The body 13 incorporates a drive unit which in this embodiment is in the form of a petrol engine 15 having an exhaust line 17.

The drive head 11 receives and supports a cutting tool 19 which in this embodiment is in the form of a cutting blade. The cutting blade 19 is driven by the engine 15 through a drive belt (not shown) enclosed in a guard 21.

The body 13 is provided with a side handle 23 and a rear handle 25 which incorporates controls including a control trigger 27 for controlling operation of the engine 15.

Figure 2:
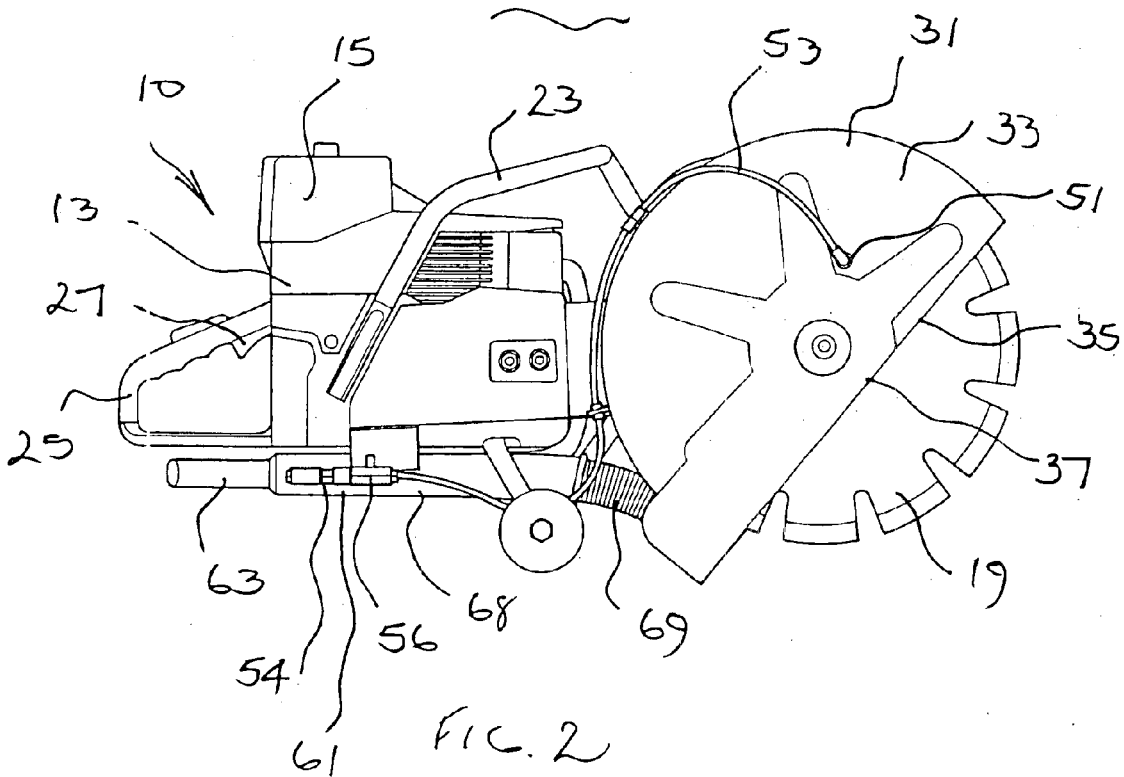
FIG. 2 is a side elevational view from the other side of the cutting machine.
Figure 3:
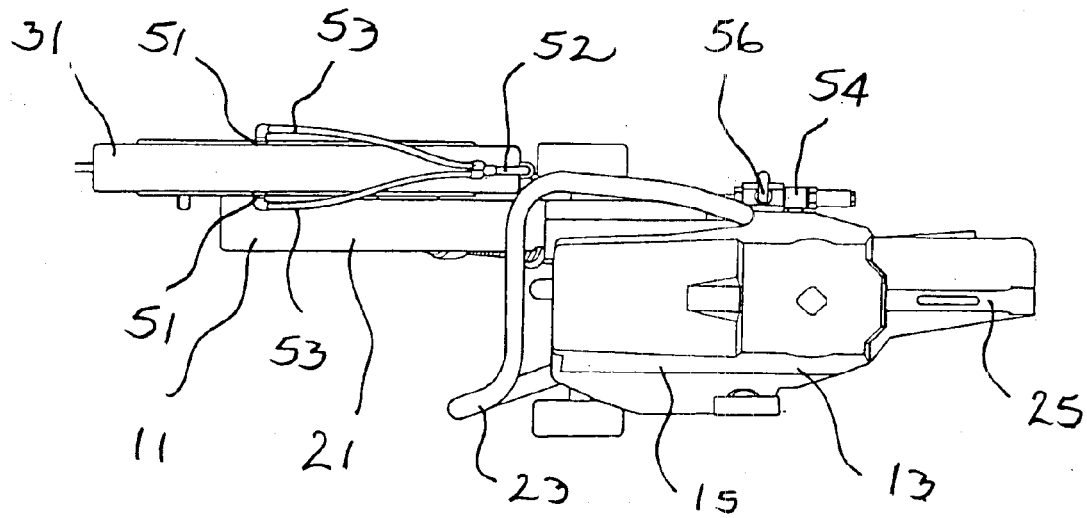
FIG. 3 is a plan view of the cutting machine.
Figure 4:
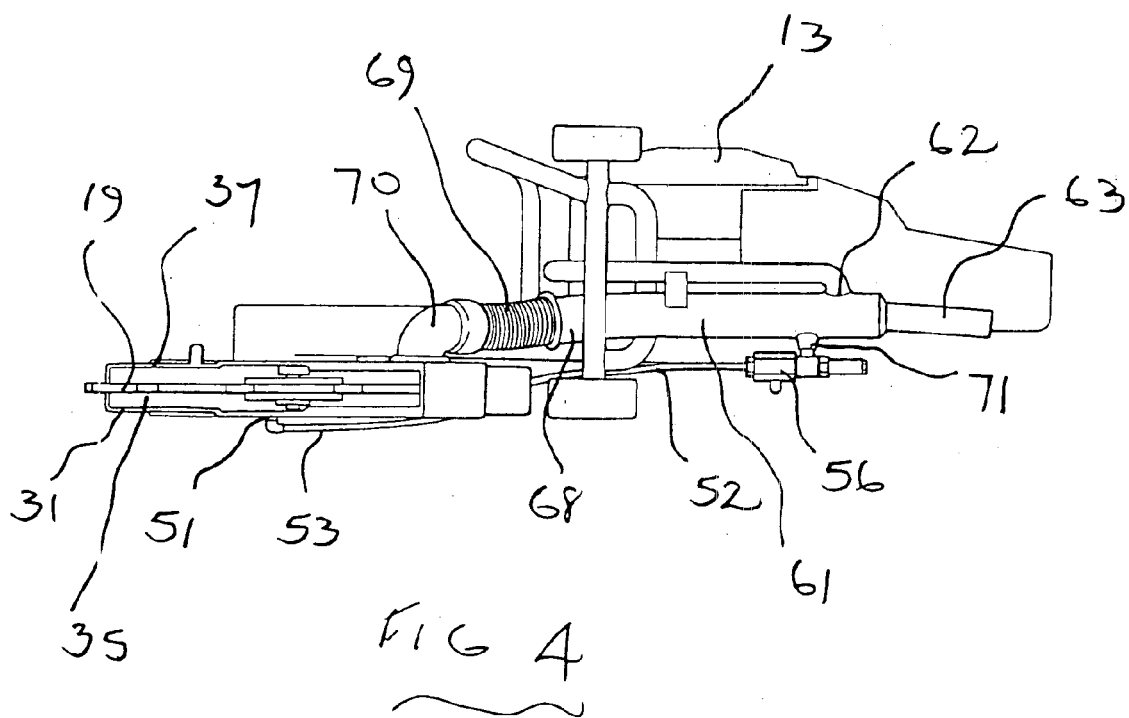
FIG. 4 is another side view of the cutting machine.
Figure 5:
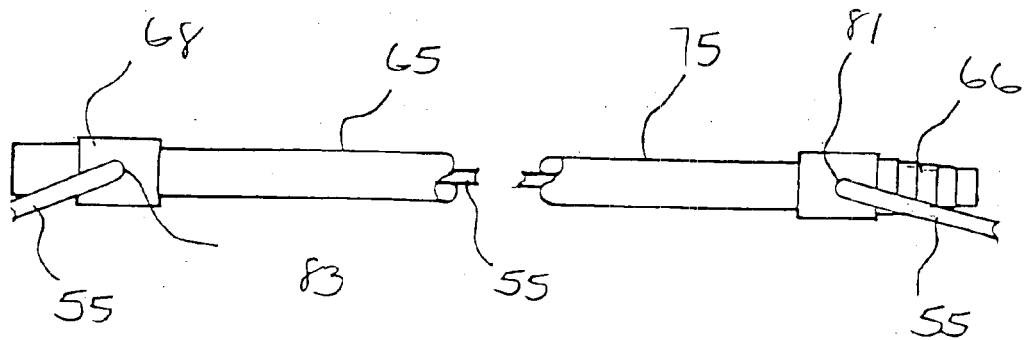
FIG. 5 is a schematic elevational view of a hose assembly for use with the cutting machine of the first embodiment.

A shroud 31 is mounted onto the drive head 11 about the cutting blade 19. The shroud 31 comprises a body 33 which encloses part of the cutting blade 19 and an opening 35 beyond which the cutting blade extends, as shown in FIGS. 1 and 2 of the drawings. With this arrangement, the shroud has an edge 37 which is adjacent the opening 35 and which is adapted to locate against the surface in which the blade 19 is performing a chasing operation. The shroud 31 incorporates removable section to provide access for mounting and removal of the cutting blade 19.

The shroud 31 is mounted for angular movement with respect to the drive head 11 between two extreme positions to accommodate changes in the orientation of the body 13 so that the edge 37 can be maintained in sealing contact with the surface in which the chasing operation is being performed while the machine is being moved over the surface. In FIG. 1, the shroud 31 is illustrated in one position, and another position is depicted in that drawing in outline by dotted lines 39.

The opening 35 in the shroud 31 is of a size to exclude the entry of rubble and other large debris generated during operation of the blade 19 from entering the shroud. There is, however, sufficient clearance between the opening 35 and the blade 19 to allow dust generated during operation of the cutting blade 19 to enter the shroud 31, as will be explained.

The purpose of the shroud 31 is to contain the dust and also to contain a slurry generated by water used to suppress the dust. Water for dust suppression purposes is injected into the shroud 31 through two water inlets 51, disposed one on each side of the blade 19. Each water inlet 51 opens onto the interior of the shroud 31 by way of a port (not shown) through which water is directed onto the cutting blade 19. The water inlets 51 are connected to a water line 52 via respective branch lines 53 which are flexible to accommodate angular movement of the shroud 31. The water line 52 is connected to a coupling 54 to which a water supply line 55 is adapted to be connected, as will be explained later. A manually operable flow control valve 56 is positioned between the water line 52 and the coupling 54 to allow water flow to the water inlets 51 to be selectively regulated or interrupted.

Water injected through the water inlets 51 is distributed within the shroud 31 by the rotating action of the blade 19 and suppresses the dust generated by the blade by formation of a slurry. Additionally, the injected water functions as a cooling fluid for the cutting blade 19.

An extraction line 61 is mounted onto the body 13. The extraction line has an outlet end 63 adapted to be connected to a suction hose 65, as will be explained later. The extraction line 61 extends to, and communicates with, the shroud 31 for intake of air from within the shroud and also for extracting the slurry generated by the dust and water. Replenishment air continually enters the shroud 31 from the surrounding environment.

The extraction line 61 incorporates rigid section 68 fixed to the machine body 13 by way of an anti-vibration mounting, and a flexible section 69 which extends to the shroud 31 and which accommodates angular movement of the shroud 31 with respect to the drive head 11. The flexible section 69 is telescopically received in the rigid section 68 so that it can extend and retract with angular movement of the shroud 31. Furthermore, the flexible section 69 is connected to the shroud body 33 by way of a swivel joint 70 which further accommodates angular movement of the shroud.

The exhaust line 17 of the internal combustion engine 15 is also connected to the extraction line 61 such that hot exhaust gases from the engine are discharged into the extraction line. This ensures that the exhaust gases are carried away from the worksite rather than being discharged into the air at the worksite. In this embodiment, the exhaust line 17 is connected to the extraction line 61 for communication therewith at junction 62. The exhaust gases also mix with air being conveyed along the extraction line 61, thereby assisting in cooling of the exhaust gases.

There is provision for introduction of water directly into the extraction line 61 for the purpose of further assisting cooling the exhaust gases discharged into the extraction line. The water is introduced into the extraction line 61 by way of a branch line 71 extending from the water supply coupling 54. The branch line 71 opens onto the extraction line 61 at a location upstream of the junction 62 at which exhaust gases discharge into the extraction line. In this way, the hot exhaust gases are exposed to the cooling effect of the water immediately upon discharging into the extraction line 61. The purpose of cooling the exhaust gases is to avoid damage to the extraction line 61 and the suction hose 65 through exposure to extreme heat. Additionally, cooling of the exhaust gases ensures that exposed surfaces of the extraction line 61 are cool so as not to scold the user in the event of the surfaces being inadvertently contacted. Some cooling will of course be achieved through contact with dust suppression water drawn from the shroud 31, however additional cooling is provided by the direct injection of water via the branch line 71.

The delivery of cooling water into the extraction line 61 is not regulated by the flow control valve 56. In other words, cooling water is injected directly to the extraction line 61 whenever water is supplied by water supply line 55, regardless of whether the flow control valve 56 is open or closed.

Cooling within the extraction line 61, and the suction hose 65 connected thereto, is assisted by atmospheric air being drawn into the extraction line 61 at the shroud 31 through suction. The incoming cooling air has a diluting effect on the exhaust gases introduced into the extraction line of junction 62.

A hose assembly 75 is provided for use with the machine 10. The hose assembly 75 comprises the water line 55 and the suction hose 65. The water line 55 has one end 56 thereof adapted for connection to the fitting 53 on the water inlet 51. The other end of the water supply line 55 is adapted for connection to a source of water under pressure such as a mains supply (not shown).

One end 66 of the suction hose 65 is adapted for connection to the outlet 63 of the suction line 61. The other end 68 of the suction hose 65 is adapted for connection to a vacuum source such as a vacuum pump 77 at which a filtering process is performed to filter the slurry and solid particles from the air and exhaust gases. The vacuum pump 77 has a discharge line 79 through which the filtered air and exhaust gases are discharged to atmosphere. In addition to creating fluid flow along the extraction line 61 and the suction hose 65, the suction effect provided by the vacuum pump 77 also provides noise suppression for the cutting machine 10.

A particular feature of the hose assembly 75 is that the water delivery line 55 extends for most of its length through the interior of the suction hose 65. The water delivery line 55 enters the suction hose 65 at location 81 adjacent the end 66 and leaves the suction hose at location 83 adjacent the end 68. With this arrangement, for most of the length of the water delivery line 55, it is accommodated within the suction hose 65, and can be handled as a single unit.

Figure 6:
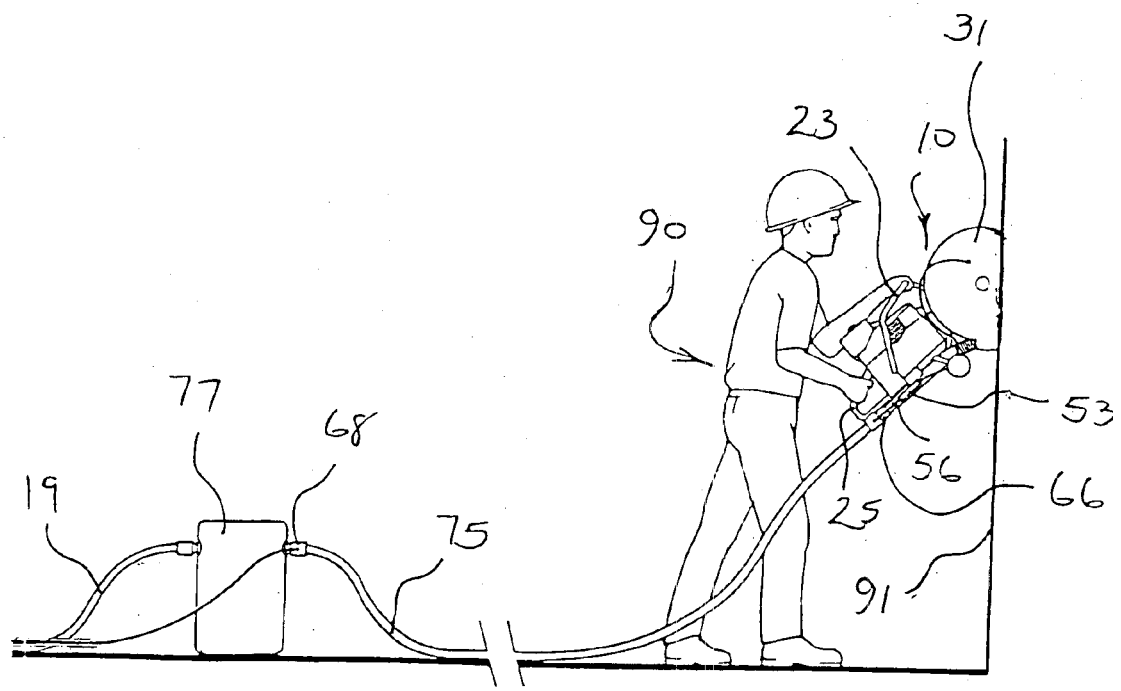
FIG. 6 is a schematic view illustrating the cutting machine according to the first embodiment in operation.

The machine 10 is held and operated by hand, with an operator 90 gripping the machine by handles 23, 25, as shown in FIG. 6. The operator 90 is shown using the machine 10 to perform a cutting or chasing operation in a wall surface 91. In operation of the machine 10, water is injected through inlet 51 into the shroud 31 for the purposes of suppressing dust generated by the cutting blade 19, as well as lubricating the blade. The injected water combines with the dust to form a slurry which is extracted from the shroud 31 along the extraction line 61. During the cutting operation, the edge 37 of the shroud 31 bears against the wall other surface 91, and so resists leakage of slurry from the shroud 31. The dust generated during the cutting operation is carried into the shroud 31 by the rotating action of the blade 19, as well as by the suction created within the shroud. The flexible nature of the water branch lines 53 connected to the inlets 51 and the flexible section 69 within the extraction line 61 permits the angular movement of the shroud 31 with respect to the drive head 11. Exhaust gases generated by the engine 15 discharge into the extraction line 61 and are extracted along with the slurry. The presence of water in the slurry has a cooling effect on the exhaust gases, so ensuring that the heat of the exhaust gases does not damage the extraction line 61 and the suction hose 65 to which it is connected. Additional cooling is provided by cooling water injected into the extraction line 61 through branch line 71. The slurry and the exhaust gases are carried along the extraction line 61 and the suction hose 65 to the vacuum pump 77 where the slurry can be collected and the exhaust gases discharged to atmosphere.

In the first embodiment, the machine 10 was in the form of a hand-held unit. Other arrangements are, of course, possible. For example, the machine may be in the form of a unit adapted to be supported on and moved along the surface on which a cutting or chasing operation is to be performed. One such unit will now be described in relation to the second embodiment as shown in FIGS. 7 and 8.

Figure 7:
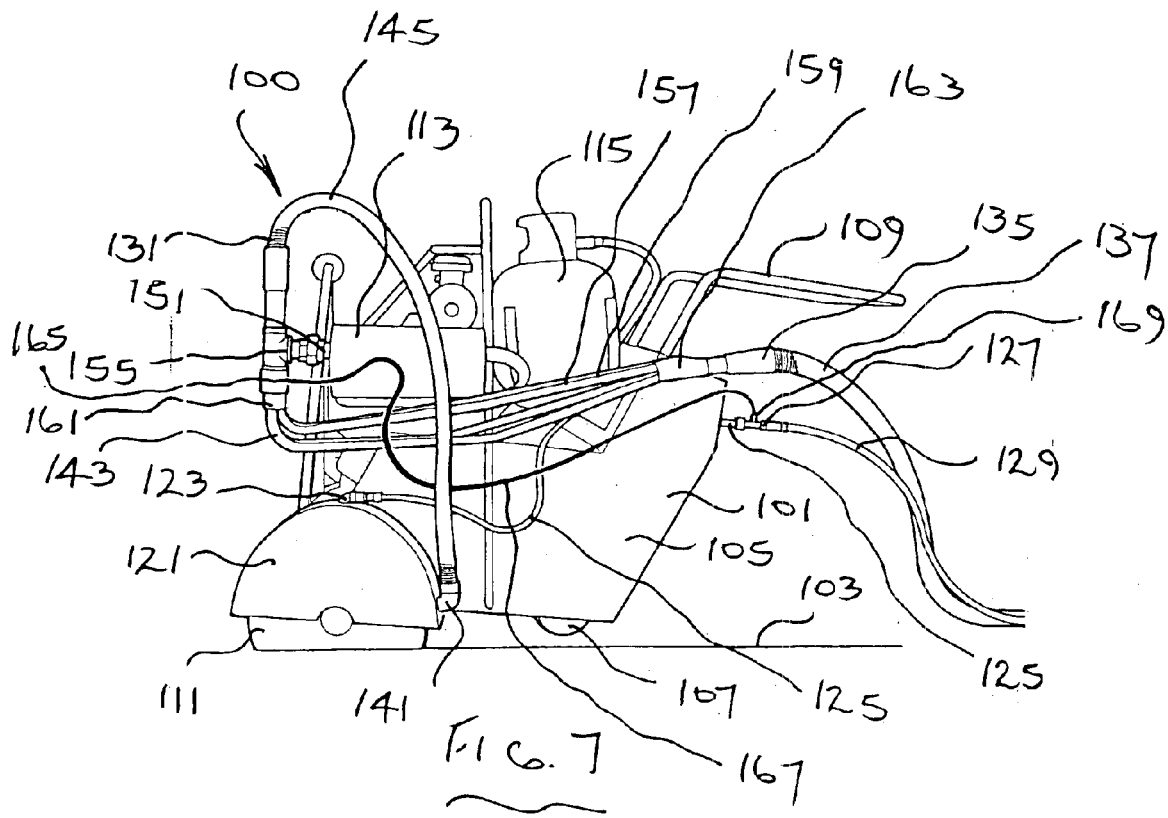
FIG. 7 is a side elevational view of a cutting machine according to a second embodiment.
Figure 8:
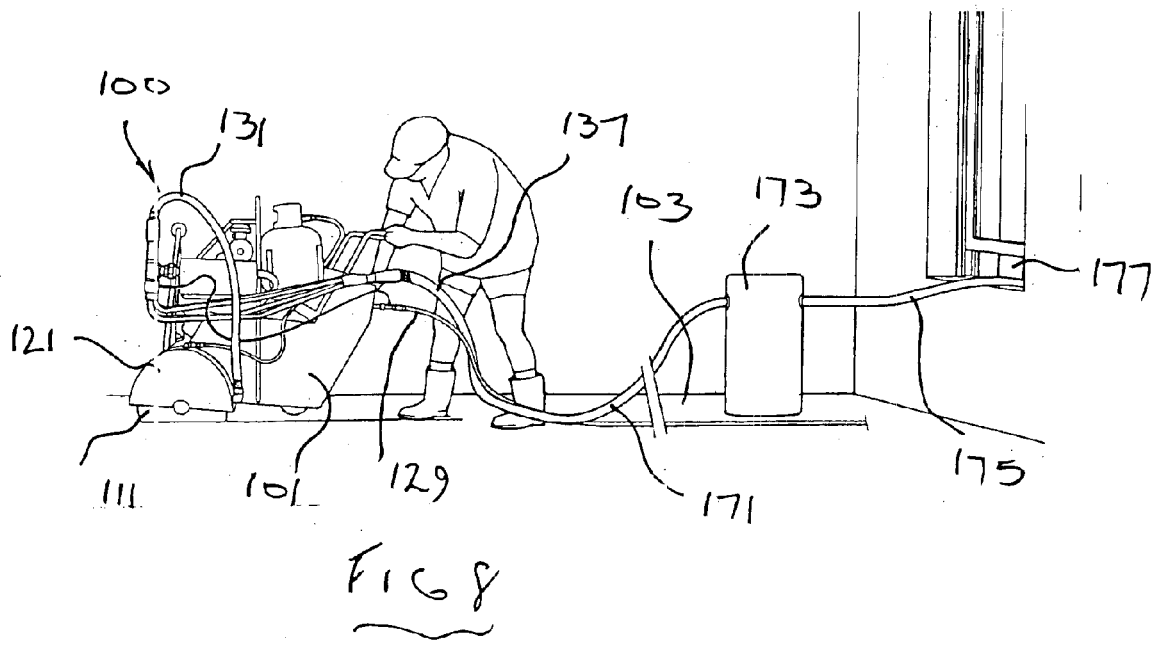
FIG. 8 is a schematic perspective view illustrating the cutting machine according to the second embodiment in operation.

Referring now to FIGS. 7 and 8, the cutting machine 100 according to the second embodiment comprises a floor saw 101 of conventional construction movable over a floor surface 103 in which a cutting or chasing operation is to be performed. The floor saw 101 comprises a body 105 supported on wheels 107 for movement over the floor surface 103. The body 105 is fitted with a handle structure 109 by means of which it can be propelled over the floor surface. The floor saw 101 incorporates a drive head (not shown) which receives and supports a cutting tool 111 which is of known kind and which in this embodiment is in the form of a cutting blade. The cutting blade is driven by an engine 113 through a transmission system (not shown) which delivers rotational torque from the engine 113 to the drive head. In this embodiment, the engine 113 is an internal combustion engine operating with gaseous fuel stored in a storage tank 115 carried on the body 105. It will of course be appreciated that the engine may be of any other appropriate type.

A shroud 121 is mounted on the drive head about the cutting blade 111. The shroud 121 is of similar construction to the shroud 31 of the first embodiment and is angularly moveable to accommodate changes in the orientation of the body 105 with respect to the floor surface 103 so as to maintain sealing contact with the floor surface while the machine is being moved over the surface during a cutting operation.

Water for dust suppression purposes is injected into the shroud 121 through a water inlet 123 which is connected to one end of a flexible water line 125, the other end of which is connected to a coupling 127 to which a water supply line 129 is adapted to be connected. The water supply line 129 supplies water from a source such as a main supply, as was the case in the first embodiment.

An extraction line 131 is mounted on the body 105. The extraction line 131 has an outlet end 135 adapted to be connected to a suction hose 137. The extraction line 131 extends to and communicates with the shroud 121 via coupling 141 for extracting the slurry generated by the dust and water. The extraction line 131 incorporates a rigid section 143 mounted on the body 105 and a flexible section 145 which accommodates angular movement of the shroud 121 with respect to the drive head.

The engine 113 has an exhaust line 151 which is connected to the extraction line 131 at junction 155 so that exhaust gases from the engine 113 are discharged into the extraction line 131, as was the case with the first embodiment.

The rigid section 143 of the extraction line incorporates a heat exchanger 157 to assist with cooling of the exhaust gases. The heat exchanger 157 is configured from a plurality of pipe sections 159 which diverge from each other at location 161 and converge at location 163. The pipe sections 159 are in spaced apart relationship between locations 161 and 163 in order to optimise the surface area in contact with the surrounding air for heat exchange purposes.

Additionally, cooling water is injected into the extraction line 131 at injection point 165. Cooling water for injection into the extraction line 131 at injection point 165 is delivered by way of a water line 167, one end of which is connected to the injection location 165 and the other end of which is connected to a branch portion 169 of the coupling 127.

The water line 129 and the suction hose 137 are incorporated into a common hose assembly 171 as shown in FIG. 8 of the drawings and as was the case with the first embodiment. The suction hose 135 within the hose assembly 171 is connected to a vacuum source 173 to which the slurry, air and exhaust gases are carried from the extraction line 131. At the vacuum pump 173 the slurry is collected and the exhaust gases and air discharged to atmosphere by way of a discharge line 175.

Where the cutting machine 100 is being operated within a closed environment such as within a building, the discharge line 175 can be positioned to extend to the exterior of the building so that exhaust gases are discharged outside of the confined working environment. This is illustrated in FIG. 8 of the drawings where the discharge line 175 can be seen extending through a window 177 so that exhaust gases are discharged to the outside of the building.

A feature of the cutting machine 100 according to the second embodiment is that the flexible section 145 of the extraction line 131 can be detached from the coupling 141, so allowing the unit to be used as a vacuum cleaner for extracting debris and remnant slurry remaining at the work site. This is of course usually done when drive is not being transmitted to the cutting blade 111.

In each of the embodiments described, the cutting machine 10, 100 was in the form of a conventional cutting unit modified to incorporate the extraction apparatus according to the invention. It should, however, be appreciated that a dedicated cutting machine can be constructed incorporating the extraction apparatus according to the invention.

A modification to either or both of the cutting machines according to the embodiments described may involve the provision of a flow switch or sensor to detect the presence of water for dust suppression and cooling purposes, and to prevent operation of the machine in the absence of adequate water. Similarly, a flow switch or sensor may be incorporated to detect the presence of appropriate airflow along the extraction line 61, and to prevent operation of the machine in the absence of adequate airflow.

From the foregoing it is evident that the first and second embodiments described each provide a simple yet highly effective arrangement for suppressing dust during a cutting or chasing operation, and also for conveying slurry generated by the dust suppression process and exhaust gases generated by operation of the machine away from the worksite.

While the first and second embodiments have been described in relation to a machine for performing chasing and cutting operations, it should also be understood that the features of dust suppression, and slurry and exhaust gas extraction may be utilised for machines having tools other than cutting blades, such as for example drilling tools and grinding tools.

Figure 9:
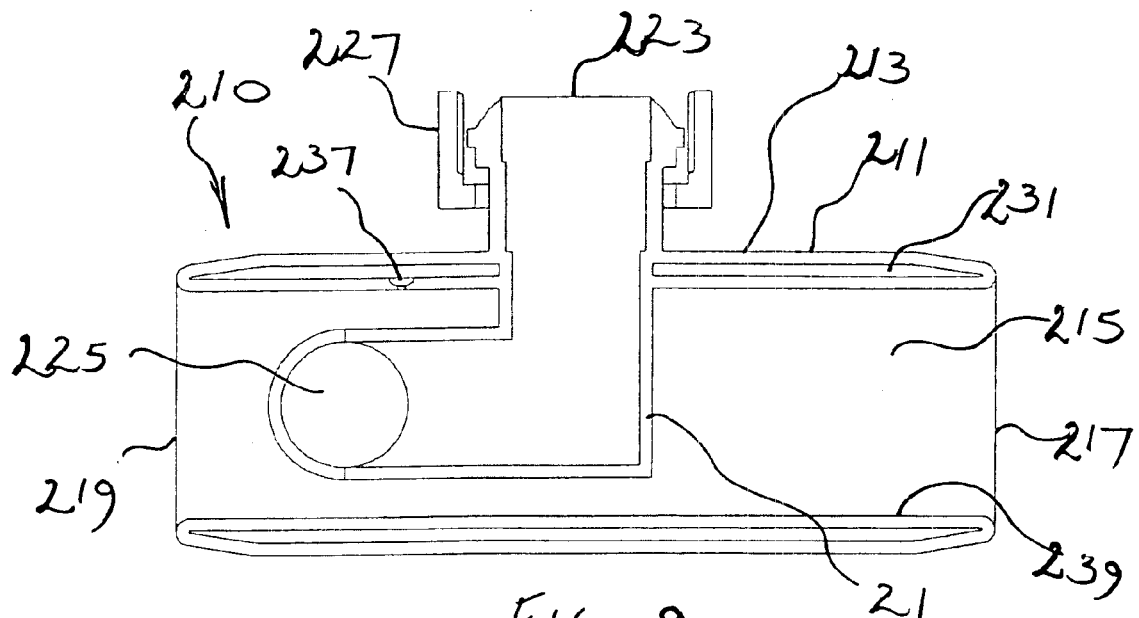
FIG. 9 is a schematic, sectional side elevational view of an extraction apparatus according to a third embodiment.
Figure 10:
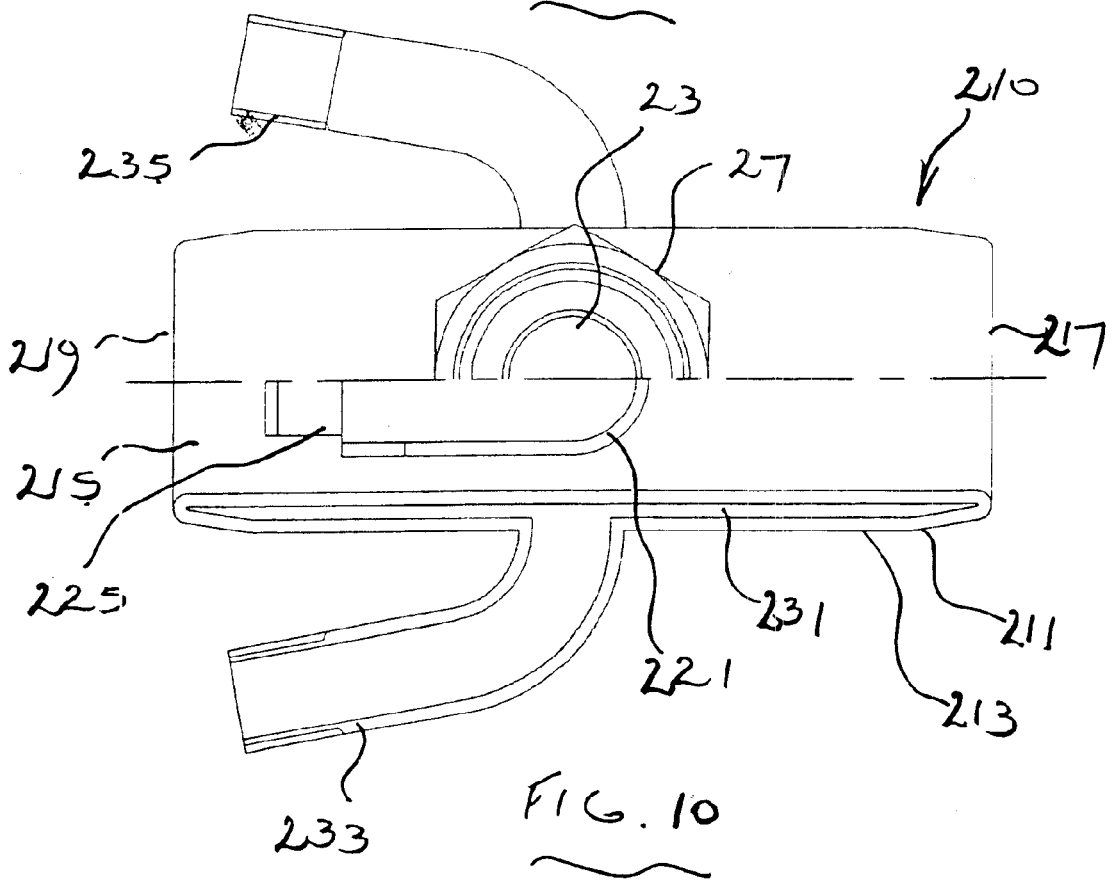
FIG. 10 is a plan view of the apparatus of FIG. 9.

Referring to FIGS. 9 and 10 of the drawings, there is shown an extraction apparatus 200 according to a third embodiment. The apparatus 200 is an attachment for a cutting machine (not shown) for performing cutting and chasing operations on wall and floor surfaces.

The cutting machine typically comprises a work head and a body carrying the work head. The body incorporates a drive unit in the form of an internal combustion engine (typically a petrol engine) having an exhaust line.

The drive head receives and supports a cutting tool, typically in the form of a cutting blade. A shroud is mounted onto the drive head about the cutting blade. The shroud encloses part of the cutting blade and has an opening beyond which the cutting blade extends. The purpose of the shroud is to contain the dust and, if water is used for dust suppression, to also contain slurry generated by the water used to suppress the dust. Such an arrangement is similar to the cutting machine 10 described in relation to the first embodiment.

The apparatus 210 comprises a body 211 having a tubular portion 213 defining a central flow passage 215. The flow passage 215 extends axially between two ends, at one of which there is provided an air inlet 217 and at the other of which there is provided an outlet 219. The outlet 219 is adapted for connection to one end of a suction hose (not shown), the other end of the suction hose being which is adapted for connection to a suction source such as a vacuum pump.

The body 211 further comprises an exhaust gas inlet 221 having an intake end 223 and a discharge end 225. The intake end 223 is adapted for connection to the exhaust line of the engine, and a coupling 227 is provided for that purpose. The exhaust gas inlet 221 is so configured that the discharge end 225 is centrally located within the flow passage 215 as well as opening onto the flow passage 215 in the direction towards the outlet 219.

With the arrangement of the air inlet 217 and the exhaust gas inlet 221, there is confluence (in the flow passage 215) of incoming air and exhaust gas. The incoming air and exhaust gas streams combine in the flow passage 215 and exit through the outlet 219 as a common stream flowing along the suction hose under the influence of the vacuum pump.

The confluence of the incoming air and the hot exhaust gas streams is advantageous in that contact of the cooler air stream with the hot exhaust gas stream effects cooling of the exhaust gas. Additionally, the cooler air dilutes the hot exhaust gas, and the temperature of the resultant combined air/exhaust gas stream is lower than that of the exhaust gas alone.

The body 211 has provision for water flow in heat exchange relationship therewith for cooling purposes. Specifically, the body 211 incorporates a water jacket 231 disposed about the flow passage 215. Water flows through the water jacket 231 between a water inlet 233 and a water outlet 235. The water inlet 233 and water outlet 235 are connected into a flexible water delivery line (not shown). Water leaving the outlet 235 can be conveyed away and discarded, or alternatively used for other purposes such as dust suppression at the shroud (in the case where the machine has a dust suppression facility).

There is also provision for injection of water into the flow passage 215 to further assist cooling of the hot exhaust gas. In this embodiment, water is injected into the flow passage 215 through an injection port 237 adapted to receive water for injection from the water jacket 31 in the body 211. The injection port 237 is provided in the side wall 239 of the flow passage at a location upstream of the discharge end 225 of the exhaust gas inlet 221. The location of the injection port 237 relative to the discharge end 225 is intended to reduce any possibility of injected water entering the exhaust system of the engine in the event of the engine not being operational while water injection is occurring.

The injected water is conveyed along the flow passage 215 to the outlet 219 and then along the suction hose, together with the air and exhaust gas.

The provision of cooling for the exhaust gas using water may be selective, in that apparatus 210 may be operated either with, or without, the delivery of water to the water jacket 231 for heat exchange and water injection. This can be controlled by a suitable control valve (not shown) in the water supply line.

In addition to creating fluid flow along the flow passage 215 as well as the suction hose, the suction effect provided by the vacuum pump may also provide noise suppression for the cutting machine.

The apparatus 210 can be operated with the air inlet 217 opening directly to atmosphere at the location where the machine is being used. In other words, air is drawn directly into the flow passage 215 through the air inlet 217 under the influence of suction created by the vacuum pump.

The apparatus 210 can also be operated in another way, where the air inlet 217 is connected to the shroud of the cutting machine so as to communicate with the containment zone defined within the shroud. With this arrangement, air is drawn from within the containment zone. The air is likely to be accompanied by dust generated during operation of the tool, and possibly also water and/or slurry in circumstances where there is use of water for dust suppression. There may be a filtering process performed at the vacuum pump to filter the slurry and solid particles from the air and exhaust gas. The vacuum pump may have a discharge line through which the filtered air and exhaust gas are discharged to atmosphere.

Referring now to FIG. 11, there is shown apparatus 210 according to a fourth embodiment. As the fourth embodiment is similar in many respects to the third embodiment, corresponding reference numerals are used to denote similar parts. The fourth embodiment is different from the third embodiment in that it is designed for operation with a larger cutting machine. The fourth embodiment incorporates two water jackets 231 about the flow passage 215, each having an injection port 237 associated therewith. Additionally, there is a water jacket 241 about the exhaust gas inlet 221 to further assist cooling of the exhaust gas and the body 211 generally.

It should be appreciated that the scope of the invention is not limited to the scope of the embodiments described.

While the third and fourth embodiments have been described in relation to a machine for performing chasing and cutting operations, it should also be understood that the invention might be utilised for machines having tools other than cutting blades, such as for example drilling tools and grinding tools.

Further, the invention may be used with any machine having an engine generating hot exhaust gases that need to be cooled and conveyed away from the location at which the engine is operating.

The extraction apparatus according to each of the third and fourth embodiments is a discrete unit that is designed to be fitted as an attachment to an existing machine. It should be understood that the extraction apparatus according to the invention could be incorporated as an integral part of a machine; for example, it may be incorporated as a feature of a new machine or retro-fitted as an attachment to an existing machine.

Improvements and modifications may be incorporated without departing from the scope of the invention. For instance, a blower source may be connected to the inlet to induce flow rather than requiring a suction source to be connected to the outlet.

It should be appreciated that the scope of the invention is not limited to the scope of the embodiments described.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. An extraction apparatus for a machine having a tool for performing a working operation on a workpiece and a drive motor for driving the tool, the drive motor having an exhaust through which an exhaust fluid is discharged during operation of the drive motor, the extraction apparatus comprising a shroud disposed about the tool for containing dust generated thereby, and an extraction line, the extraction line communicating with the shroud for intake of air within the shroud, the extraction line further communicating with the exhaust of the drive motor for receiving exhaust fluid generated thereby, whereby there is confluence of the air and the exhaust fluid.

2. An extraction apparatus according to claim 1 wherein the shroud is movable to accommodate changes in orientation of the apparatus with respect to the workpiece.

3. An extraction apparatus according to claim 2 wherein the extraction line incorporates a flexible section to accommodate the movement of the shroud.

4. An extraction apparatus according to claim 1 wherein the extraction line is adapted for connection to a suction source such as a vacuum pump.

5. An extraction apparatus according to claim 1 further comprising a delivery means for delivering a dust suppression fluid into the shroud.

6. An extraction apparatus according to claim 5 wherein the delivery means comprises a flexible fluid delivery line.

7. An extraction apparatus according to claim 1 further comprising injection means for injecting a cooling fluid into the extraction line.

8. An extraction apparatus according to claim 7 wherein the dust suppression fluid and the cooling fluid comprise water.

9. An extraction apparatus according to claim 6 the extraction line is connected to a suction source by way of a suction hose and wherein the suction hose and the fluid delivery line are connected together for handling as a single unit.

10. An extraction apparatus for a machine having a tool for performing a working operation on a workpiece and a drive motor for driving the tools, the drive motor having an exhaust through which an exhaust fluid is discharged during operation of the drive motor, the extraction apparatus comprising a means for delivering a dust suppression fluid to the vicinity of the tool for suppression of dust generated thereby, a shroud disposed about the tool for containing the dust and the dust suppression fluid, and an extraction line, the extraction line communicating with the shroud for extracting dust and dust suppression fluid contained by the shroud, the extraction line also communicating with the exhaust of the drive motor for receiving the exhaust fluid generated thereby.

11. A machine for performing a working operation on a workpiece, the machine comprising a tool receiving means for receiving a tool for performing the working operation, a drive motor operable to drive the tool, the drive motor having an exhaust through which an exhaust fluid is discharged during operation, a shroud disposed about the tool for containing dust, and an extraction line, the extraction line communicating with the shroud for intake of air within the shroud, the extraction line further communicating with the exhaust of the drive motor for receiving the exhaust fluid discharging therefrom, whereby there is confluence of the air and the exhaust fluid.

12. A machine according to claim 11 further comprising a delivery means for delivering a dust suppression fluid into the shroud.

13. A machine according to claim 12 wherein the delivery means comprises an inlet opening onto the interior of the shroud whereby the dust suppression fluid is delivered into the shroud.

14. A machine according to claim 11 wherein the drive motor is an internal combustion engine and wherein the exhaust fluid comprises exhaust gases from the combustion process of the engine.

15. A machine for performing a working operation on a workpiece, the machine comprising a tool receiving means for receiving a tool for performing the working operation, a drive motor operable to drive the tool, the drive motor having an exhaust through which an exhaust fluid is discharged during operation, means for delivering a dust suppression fluid into the vicinity of the tool for suppressing dust generated thereby, a shroud disposed about the tool for containing dust and the dust suppression fluid, and an extraction line, the extraction line communicating with the shroud for extracting dust and dust suppression fluid contained thereby, the extraction line further communicating with the exhaust of the drive motor for receiving the exhaust fluid discharging therefrom.

16. An extraction apparatus for a machine having an internal combustion engine from which hot exhaust gases are discharged during operation thereof, the extraction apparatus comprising a body defining an outlet, an air inlet communicating with the outlet, flow means to induce flow between the outlet and the inlet from the inlet to the outlet, and an exhaust gas inlet communicating with the outlet, whereby in use there is confluence of incoming air and exhaust gas.

17. An extraction apparatus according to claim 16 wherein the body defines a flow passage leading to the outlet, with the air inlet and the exhaust gas inlet both opening onto the flow passage.

18. An extraction apparatus according to claim 17 wherein the flow passage comprises an axial passage, with the air inlet being at one end thereof and the outlet being at the other end thereof.

19. An extraction apparatus according to claim 18 wherein the exhaust gas inlet is arranged to deliver exhaust gas into the flow passage downstream of the air inlet.

20. An extraction apparatus according to claim 19 wherein the exhaust gas inlet is configured to deliver exhaust gas into the flow passage in a flow direction corresponding to the axial flow direction of the air.

21. An extraction apparatus according to claim 17 wherein a water jacket is disposed about the passage for heat exchange contact therewith.

22. An extraction apparatus according to claim 16 wherein the body has provision for water flow in heat exchange relationship therewith for cooling purposes.

23. An extraction apparatus according to claim 16 further comprising injection means for injection of water into the flow passage for assisting cooling of the exhaust gas.

24. An extraction apparatus according to claim 23 wherein the injection means comprises at least one water injection port in the side wall of the flow passage.

25. An extraction apparatus according to claim 24 wherein the at least one injection port is adapted to receive water for injection from the water jacket in the body.

26. A machine for performing a working operation on a workpiece, the machine comprising a tool receiving means for receiving a tool for performing the working operation, an internal combustion engine operable to drive the tool, the engine having an exhaust through which exhaust gas is discharged during operation, a body defining an outlet for connection to a suction source, the outlet being connected for fluid communication with the engine exhaust, and an air inlet connected for fluid communication with the outlet, whereby in use there is confluence of incoming air and exhaust gas.

* * * * *